United States Patent [19]
Duprez

[11] 4,454,848
[45] Jun. 19, 1984

[54] DIESEL FUEL CONTROL APPARATUS AND SYSTEM

[76] Inventor: Wayne R. Duprez, Standard-Thomson Corporation, 152 Grove St., Waltham, Mass. 02154

[21] Appl. No.: 411,257

[22] Filed: Aug. 25, 1982

Related U.S. Application Data

[63] Continuation-in-part of Ser. No. 303,486, Sep. 18, 1981, which is a continuation of Ser. No. 57,398, Jul. 13, 1979, abandoned.

[51] Int. Cl.³ .................. F02M 55/00; F02M 31/00
[52] U.S. Cl. ........................ 123/516; 123/514; 123/557
[58] Field of Search ............ 123/516, 514, 557, 512, 123/511

[56] References Cited

U.S. PATENT DOCUMENTS

| | | |
|---|---|---|
| 1,909,390 | 5/1933 | Ball et al. |
| 2,222,274 | 11/1940 | Antonsen ............................ 123/516 |
| 2,599,699 | 6/1952 | Dilworth . |
| 4,117,817 | 10/1978 | Nishida .............................. 123/516 |
| 4,320,734 | 3/1982 | Balachandran ..................... 123/516 |

FOREIGN PATENT DOCUMENTS

| | | |
|---|---|---|
| 2333971 | 7/1977 | France . |
| 2386692 | 11/1978 | France . |
| 1433875 | 4/1976 | United Kingdom . |
| 2031994 | 4/1980 | United Kingdom . |

*Primary Examiner*—Charles J. Myhre
*Assistant Examiner*—Carl Stuart Miller

[57] ABSTRACT

Diesel fuel control apparatus in a system in which fuel flows to a diesel engine from a fuel tank. A portion of the fuel is consumed by the diesel engine. Excess fuel flows from the diesel engine in a heated condition. The excess fuel has air entrained therein. A diesel fuel filter housing is attached to the diesel fuel control apparatus and is in fluid communication therewith. The diesel fuel control apparatus receives heated fuel and air entrained therein and supplies heated fuel without air therein to mix with fuel flowing from the fuel tank to the fuel filter housing.

10 Claims, 5 Drawing Figures

U.S. Patent  Jun. 19, 1984  Sheet 1 of 2  4,454,848
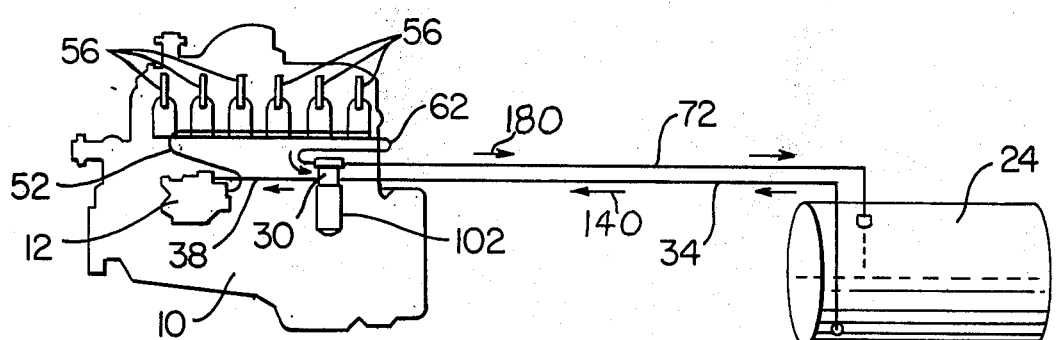
FIG.1
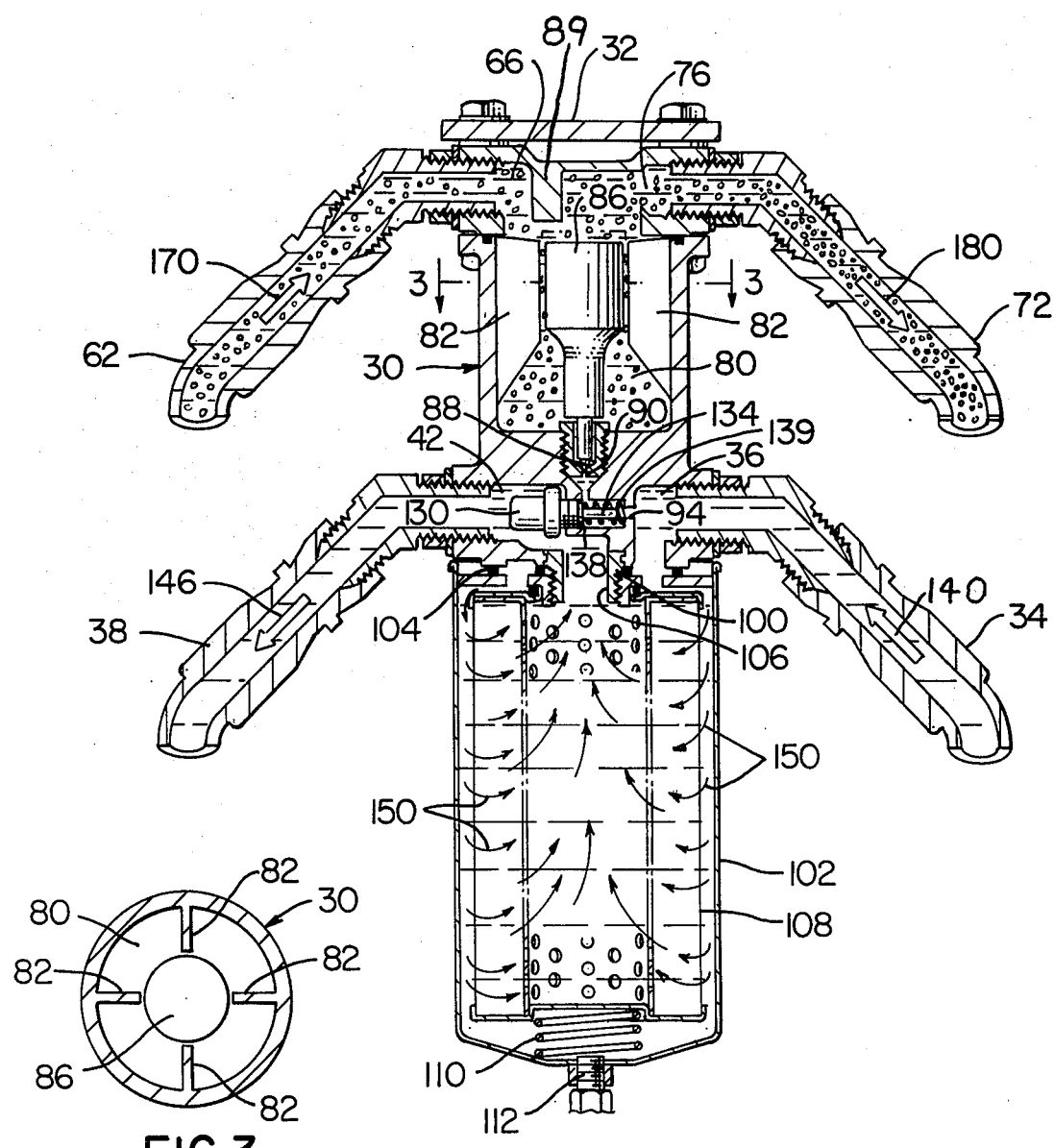
FIG.3
FIG.2

DIESEL FUEL CONTROL APPARATUS AND SYSTEM

RELATED APPLICATION

This application is a continuation-in-part of Application Ser. No. 303,486, still pending, filed Sept. 18, 1981, which is a continuation of Application Ser. No. 57,398, filed July 13, 1979, now abandoned.

BACKGROUND OF THE INVENTION

In most diesel engine systems there is a filter device through which fuel must flow to reach the engine. When the engine apparatus is subjected to temperatures in the region of zero degrees Fahrenheit and lower, there is a tendency for crystals and solid wax particles to form in the diesel fuel. Such conditions cause clogging of the fuel filter device.

In a conventional diesel engine apparatus only a portion of the fuel pumped to the engine is used, and the excess fuel which flows from the engine contains gas, in the form of entrained air, which is ordinarily vented from the fuel in the fuel tank as the excess fuel with the entrained air therein returns to the fuel tank.

Attempts have been made to mix heated return fuel with fuel flowing from the fuel tank in order to provide fuel to the engine at a temperature which does not permit the formation of wax particles in the fuel, to avoid clogging of the fuel filter. However, the entrained air in the heated return fuel presents a problem, due to the fact that the diesel engine must have sufficient fuel to operate, and excessive air in the fuel robs the engine of fuel necessary for operation.

Various methods have been employed in an attempt to overcome these problems. For example, No. 1 fuel oil is mixed with the conventional No. 2 diesel fuel oil, to provide a fuel in which wax crystallization does not occur so readily in cold weather. This mixing process has not been found to be satisfactory and adds to the expense of the fuel.

U.S. Pat. Nos. 2,881,828 and 3,472,214 show the use of heat exchanger devices to heat the fuel, to avoid wax crystallization. However, such devices may not provide heat to the fuel until a significant period of time has elapsed, and therefore fuel filter clogging may occur with initial operation.

U.S. Pat. No. 3,768,454 shows the use of a fuel tank which has a mixing zone with a temperature responsive valve controlling flow of fuel with respect to the mixing zone. Such a system requires an objectionable special fuel tank.

U.S. Pat. No. 2,599,699 recognizes the problem involved as entrained air flows from the diesel engine with the excess heated fuel. This patent shows a device which attempts to eliminate the air from the heated return fuel prior to mixing of the heated fuel with fuel flowing from the fuel tank. However, the device of this patent employs a fuel return tank which occupies excessive space and which employs baffles to separate air from the heated fuel. This device is therefore not satisfactory for use in the diesel engine system.

It is therefore an object of this invention to provide diesel fuel control apparatus and a system which supplies conventional diesel fuel to a diesel engine at a proper temperature and without wax crystallization therein when the diesel engine apparatus is exposed to low temperatures.

It is another object of this invention to provide such diesel fuel control apparatus which also supplies fuel to a diesel engine at a proper temperature at all environmental temperatures.

It is another object of this invention to provide such diesel fuel control apparatus and a system in which the temperature of the fuel flowing to the diesel engine is sensed by a fuel temperature control device immediately following flow of the diesel fuel through a fuel filter unit, and the temperature control device controls the temperature of fuel flowing to the fuel filter unit. Thus, the temperature of the diesel fuel flowing into the fuel filter is always at a proper temperature for fuel flow through the fuel filter without wax crystallization in the fuel.

It is another object of this invention to provide such diesel fuel control apparatus and a system which does not require a special fuel tank.

It is another object of this invention to provide such a diesel engine fuel control apparatus and a system which does not employ a fuel heater device.

It is another object of this invention to provide such a diesel fuel control apparatus and system in which additional fuel conduit lines are not required in the installation thereof.

It is another object of this invention to provide such diesel fuel control apparatus and a system which can be easily and readily installed in an existing diesel engine apparatus and system.

It is another object of this invention to provide such diesel engine fuel control apparatus and a system which is relatively small in physical size.

It is another object of this invention to provide such diesel engine fuel control apparatus and a system by which air entrained in the heated return fuel is automatically removed from the mixture of heated return fuel and air during flow of the mixture for mixing of the heated return fuel with diesel fuel flowing from the fuel tank.

It is another object of this invention to provide such diesel fuel control apparatus and a system which can be a fixed original part of a diesel engine unit and in combination with a diesel fuel filter unit.

Other objects and advantages of the diesel fuel control apparatus and system of this invention reside in the construction and arrangement of parts, the combination thereof, the method of production, and the mode of operation, as will become more apparent from the following description.

BRIEF SUMMARY OF THE INVENTION

This invention comprises diesel engine fuel control apparatus for use in a diesel system which includes a diesel engine provided with fuel injector means which receives fuel from a fuel tank. The system also includes fuel filter means, fuel conduit means for providing fuel to the fuel injector means, and fuel return means for conducting heated unused fuel from the diesel engine. The heated unused fuel has air entrained therein. The fuel control apparatus includes a housing which is attached to a diesel engine. A fuel filter housing is attached to the housing of the fuel control apparatus and is in direct fluid communication therewith. The fuel control apparatus includes means for mixing heated unused fuel with fuel which flows from the fuel tank, while preventing entrained air in the heated fuel from mixing with the fuel which flows to the diesel engine. The fuel control apparatus also includes thermally responsive fuel control valve means which senses the temperature of the fuel after the fuel flows through the fuel filter and which controls the temperature of the mixture of unused heated fuel and fuel which flows from the fuel tank, as the mixture flows to the fuel filter.

BRIEF DESCRIPTION OF THE VIEWS OF THE DRAWING

FIG. 1 is a diagrammatic view showing a diesel engine and fuel system which includes fuel control apparatus of this invention fixedly attached to the diesel engine.

FIG. 2 is a cross-sectional diagrammatic type of view, drawn on a much larger scale than FIG. 1, showing diesel fuel control apparatus of this invention in one of the operating modes thereof and in combination with a diesel fuel filter.

FIG. 3 is a sectional view taken substantially on line 3—3 of FIG. 2.

DETAILED DESCRIPTION OF THE INVENTION

Figure 4:
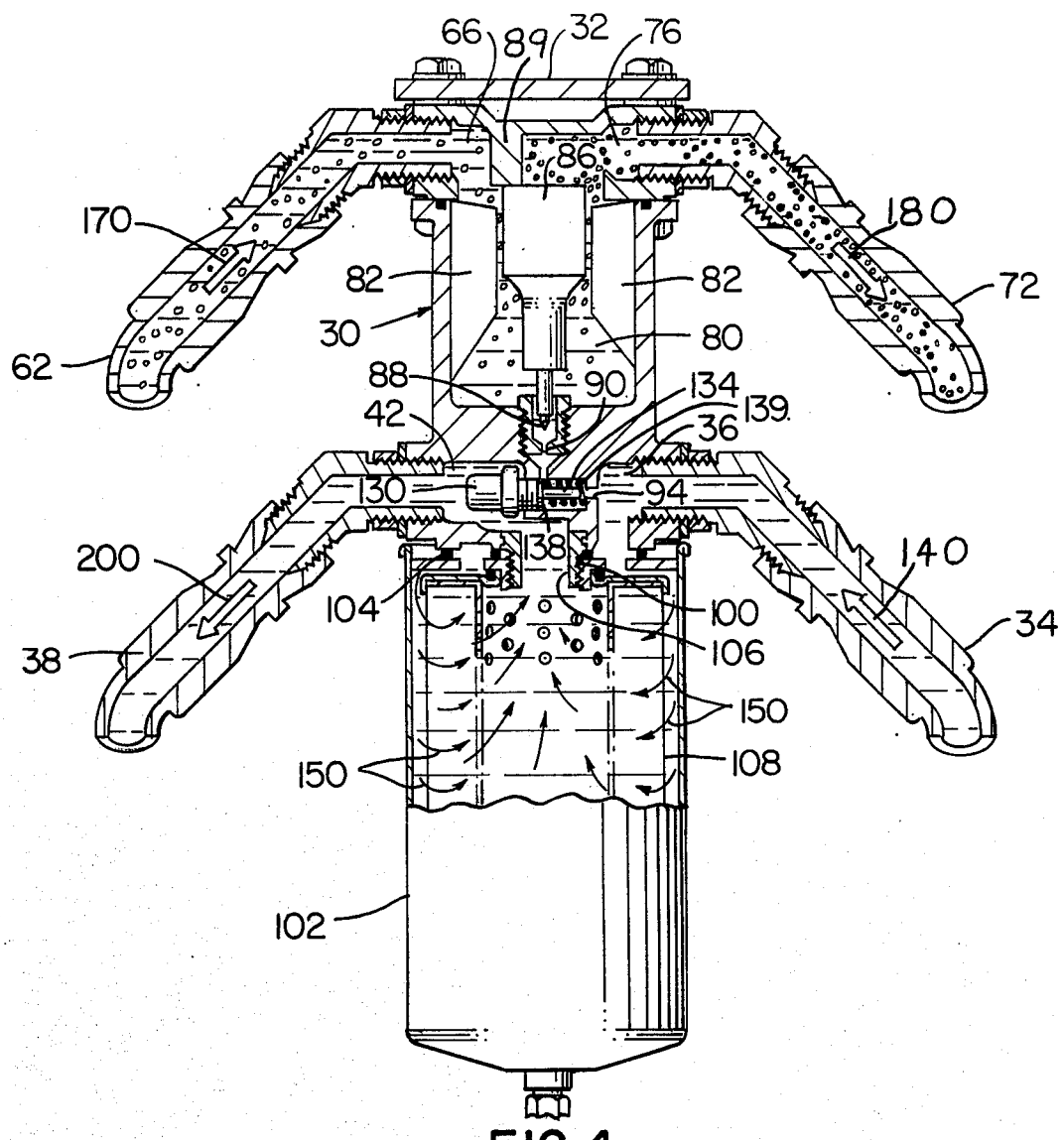
FIG. 4 is a cross-sectional diagrammatic type of view, similar to FIG. 2 and drawn on substantially the same scale as FIG. 2, illustrating the diesel fuel control apparatus of this invention in another of its operating modes.

FIG. 1 shows a diesel engine 10 provided with a fuel pump 12. Diesel fuel is supplied to the engine 10 from a fuel tank 24. A fuel control housing 30 of the fuel control apparatus of this invention is secured to the diesel engine 10 by means of a bracket 32, shown in FIGS. 2 and 4.

A fuel supply conduit 34 extends from the fuel tank 24 to the fuel control housing 30. The fuel supply conduit 34 is joined to an inlet passage 36 within the lower portion of the fuel control housing 30. A conduit 38 is joined to an outlet passage 42 of the fuel control housing 30 and extends to the fuel pump 12. A conduit 52 extends from the fuel pump 12 to a set of fuel injectors 56 of the diesel engine 10. A conduit 62 leads from the fuel injectors 56 to an inlet passage 66 at the upper portion of the fuel control housing 30. A fuel return conduit 72 is joined to an outlet passage 76 at the upper portion of the fuel control housing 30 and is also joined to the fuel tank 24.

Within the fuel control housing 30 is a fuel control chamber 80, provided with a plurality of vertically oriented spaced-apart guide fins 82. Within the fuel control chamber 80 is a buoyant member 86, which has a valve member 88 attached thereto at the lower portion thereof. The buoyant member 86 is movable upwardly and downwardly within the fuel control chamber 80, and the movement of the buoyant member 80 is guided by the guide fins 82. At the upper portion of the fuel control chamber 80 is an abutment member 89 which limits upward travel of the buoyant member 80. The valve member 88 is movable with movement of the buoyant member 86. The valve member 88 is movable with respect to a passage 90 in the housing 30, for controlling flow of fluid through the passage 90.

The fuel control housing 30 has a threaded stem 100 at the lower portion thereof, to which is threadedly attached a fuel filter housing 102. Seal members 104 provide a sealing action between the fuel filter housing 102 and the fuel control housing 30. The threaded stem 100 has a passage 106 therethrough, for communication between the fuel filter housing 102 and the outlet passage 42. Within the fuel filter housing 102 is a tubular filter element 108, which is seated upon a spring 110 within the fuel filter housing 102. A plug 112 is shown at the bottom end of the fuel filter housing 102 and is removable for draining the fuel filter housing 102.

Within the outlet passage 42 is a thermally responsive actuator 130 which is provided with an actuator stem 134 to which a collar 138 is attached. A helical spring 139 encompasses the actuator stem 134 and engages the collar 138. The spring 139 also engages a portion of the fuel control housing 30 adjacent the passage 94 and urges the actuator stem 134 in a direction away from the passage 94.

OPERATION

The fuel pump 12 creates negative pressure conditions which cause fuel to flow from the fuel tank 24 in the conduit 34 toward the fuel control housing 30, as illustrated by arrows 140. The fuel flows into the inlet passage 36 of the fuel control housing 30 and then flows downwardly into the fuel filter housing 102 and through the filter element 108, as illustrated by arrows 150. The fuel then flows through the passage 106 and into the outlet passage 42. From the outlet passage 42 the fuel flows into the conduit 38, as illustrated by an arrow 146 in FIG. 2, to the fuel pump 12, and then through the conduit 52 to the fuel injectors 56 of the diesel engine 10.

Some of the fuel is then consumed in the diesel engine 10. However, the diesel engine 10 consumes only a portion of the fuel supplied thereto. Excess fuel flows from the fuel injectors 56 through the conduit 62, to the fuel control housing 30. The fuel flowing from the fuel injectors 56 through the conduit 62 is fuel which has been heated by the diesel engine 10. The heated excess fuel flowing in the conduit 62 to the fuel control housing 30, as illustrated by arrows 170, has air and, perhaps, other gases entrained therein. This heated excess fuel and entrained air flows from the conduit 62 into the fuel control chamber 80.

During normal operation of the diesel engine 10, the mixture of heated fuel and entrained air therein fills the fuel control chamber 80, as illustrated in FIGS. 2 and 4. The density of the mixture of heated excess fuel and entrained air in the fuel control chamber 80 varies with operation of the diesel engine. The buoyant member 86 is in its lowermost position in the fuel control chamber 80, as illustrated in FIG. 2, when the density of the mixture of heated excess fuel and entrained air in the fuel control chamber 80 is low. A low density of the mixture indicates that the mixture has excess air therein.

When the buoyant member 86 is in its lowermost position, as illustrated in FIG. 2, the valve member 88 closes the passage 90, and all of the heated excess fuel and entrained air which enters the fuel control chamber 80, flows from the fuel control chamber 80 through the passage 76 and into the conduit 72 and flows from the fuel control housing 30 in the conduit 72, as illustrated by an arrow 180 in FIG. 2. The excess fuel and air then flows in the conduit 72 to the fuel tank 24. The air is separated from the fuel in the fuel tank 24 and is permitted to escape from the fuel tank 24.

When the mixture of heated fuel and air in the fuel control chamber 80 has sufficient density, indicating that the air in the mixture is not excessive, the buoyant member 86 rises within the fuel control chamber 80, as illustrated in FIG. 4. When this occurs, the valve member 88 is lifted from the passage 90, and heated fuel is permitted to flow through the passage 90, into the passage 92, through the passage 94 and into the inlet passage 36, as illustrated in FIG. 4. Thus, heated fuel mixes in the inlet passage 36 with fuel flowing into the inlet passage 36 from the fuel tank 24 through the conduit 34, as illustrated in FIG. 4. The mixture of heated fuel and fuel flowing from the fuel tank 24 is, of course, at a higher temperature than the fuel flowing from the fuel tank 24. The fuel mixture has a temperature such that wax particles are not permitted to exist in the fuel mixture to cause clogging of the fuel filter element 108. The fuel mixture flows through the fuel filter element 108, through the passage 106, and through the outlet passage 42. Then the fuel flows through the conduit 38, as illustrated by an arrow 200 in FIG. 4, to the fuel pump 12, and then to the fuel injectors 56.

Figure 5:
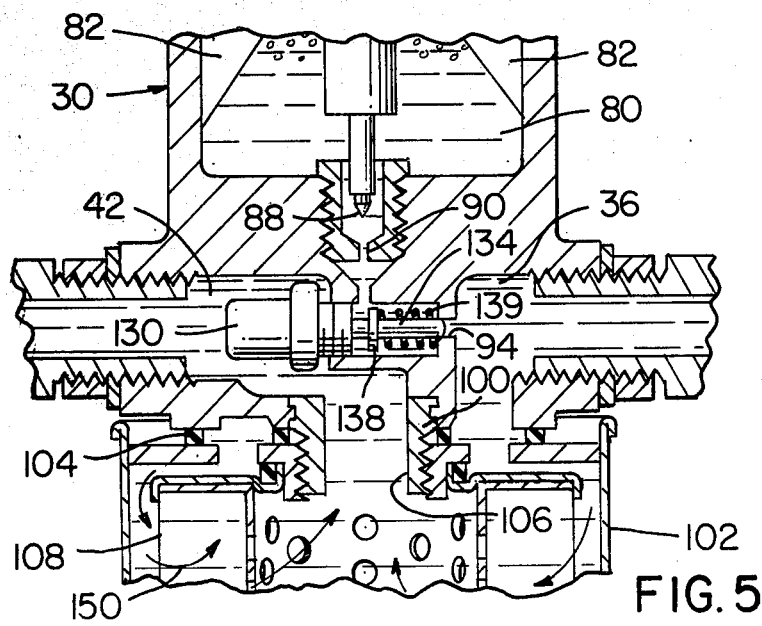
FIG. 5 is a fragmentary enlarged sectional view, drawn on a larger scale than FIG. 4, showing a portion of the diesel fuel control apparatus and fuel filter combination of this invention in another of its operating modes.

As the fuel flows through the outlet passage 42, the fuel engages the thermally responsive actuator 130. If the temperature of the fuel reaches a predetermined magnitude, the stem 134 of the thermally responsive actuator 130 is moved into the passage 94 and closes the passage 94, as illustrated in FIG. 5. It is to be noted that as the actuator stem 134 moves into the passage 94, the actuator stem 134 travels into the passage 94 to an extent dependent upon the temperature of the fuel flowing in the outlet passage 42. The actuator stem 134 does not engage an abutment to limit travel thereof. Therefore, no overtravel means is necessary with respect to the thermally responsive actuator 130.

When the actuator stem is within the passage 94, preventing fluid flow therethrough, heated fuel is prevented from flowing into the inlet passage 36 and is thus prevented from mixing with the fuel entering the passage 36 from the fuel tank 24. Thus, under these conditions all the fuel flowing through the filter element 108 is fuel which flows directly thereto from the fuel tank 24. Under these conditions, all of the heated fuel and entrained air which flows into the fuel control chamber 80 must flow from the fuel control chamber 80, through the conduit 72, to the fuel supply tank 24. As stated above, the air flowing to the fuel supply tank 24 through the conduit 72 is permitted to escape from the fuel supply tank 24. Thus, all fuel flowing from the fuel supply tank 24 through the conduit 34 is substantially free of air.

As shown and described, the thermally responsive actuator 130 is in a position to sense the temperature of the fuel after the fuel flows through the filter element 108. The thermally responsive actuator 130 controls flow of heated fuel from the fuel control chamber 80 for mixing with fuel which flows from the fuel tank 24. Therefore, the thermally responsive actuator 130 ensures that the fuel flowing into the fuel filter element 108 has a temperature of sufficient value so that wax crystallization cannot occur in the fuel flowing into the fuel filter element 108. Therefore, the temperature of the fuel flowing to the fuel filter element 108 does not permit clogging of the fuel filter element 108.

Therefore, it is to be understood that the fuel control apparatus and system of this invention provides means by which a relatively small unit attached to a diesel engine permits the diesel engine to use conventional diesel fuel during cold weather conditions. This invention also provides control of the temperature of the fuel flowing to the diesel engine.

Although the preferred embodiment of the diesel fuel control apparatus and system of this invention has been described, it will be understood that within the purview of this invention various changes may be made in the form, details, proportion and arrangement of parts, the combination thereof, and the mode of operation, which generally stated consist in a diesel fuel control apparatus and system within the scope of the appended claims.

The invention having thus been described, the following is claimed:

1. For use in a diesel system in which a diesel engine is supplied with fuel from a fuel supply tank and in which the diesel engine comsumes a portion of the fuel and in which a mixture of excess heated fuel and entrained air flows from the diesel engine, the combination: a diesel fuel control housing adapted to be attached to the diesel engine, the fuel control housing having a fuel inlet passage for receiving fuel from the fuel supply tank, the fuel control housing having a fuel outlet passage for directing fuel from the fuel control housing to the diesel engine, a diesel fuel filter housing removably attached to the diesel fuel control housing and supported by the fuel control housing, the fuel control housing forming a diesel fuel control chamber, the diesel fuel filter housing forming a fuel filter chamber provided with a fuel filter element therein, the fuel control housing forming a passage for directing fuel from the fuel inlet passage of the fuel control housing into the fuel filter chamber of the fuel filter housing, the fuel control housing forming a passage for directing fuel from the fuel filter chamber of the fuel filter housing into the fuel outlet passage of the fuel control housing, the fuel control housing forming a connecting passage between the fuel control chamber and the fuel inlet passage of the fuel control housing, the fuel control housing forming passages for directing a mixture of excess heated fuel and entrained air into the fuel control chamber from the diesel engine and for directing air to the fuel supply tank, and a buoyantly operable valve member within the fuel control chamber and controlling flow of heated fuel from the fuel control chamber through the connecting passage and to the fuel inlet passage.

2. For use in a diesel system in which a diesel engine is supplied with fuel from a fuel supply tank and in which the diesel engine comsumes a portion of the fuel and in which a mixture of excess heated fuel and entrained air flows from the diesel engine, the combination: a diesel fuel control housing adapted to be attached to the diesel engine, the fuel control housing having a fuel inlet passage for receiving fuel from the fuel supply tank, the fuel control housing having a fuel outlet passage for directing fuel from the fuel control housing to the diesel engine, a diesel fuel filter housing removably attached to the diesel fuel control housing and supported by the fuel control housing, the fuel control housing forming a diesel fuel control chamber, the diesel fuel filter housing forming a fuel filter chamber provided with a fuel filter element therein, the fuel control housing forming a passage for directing fuel from the fuel inlet passage of the fuel control housing into the fuel filter chamber of the fuel filter housing, the fuel control housing forming a passage for directing fuel from the fuel filter chamber of the fuel filter housing into the fuel outlet passage of the fuel control housing, the fuel control housing forming a connecting passage between the fuel control chamber and the fuel inlet passage of the fuel control housing, the fuel control housing forming passages for directing a mixture of excess heated fuel and entrained air into the fuel control chamber from the diesel engine and for directing air to the fuel supply tank, a buoyantly operable valve member within the fuel control chamber and controlling flow of heated fuel from the fuel control chamber through the connecting passage and to the fuel inlet passage, and thermally responsive valve means within the fuel control housing for sensing the temperature of fuel flowing in the fuel outlet passage of the fuel control housing and controlling flow of fuel from the fuel control chamber through the connecting passage into the fuel inlet passage of the fuel control housing.

3. A diesel fuel control system for control of diesel fuel to a diesel engine provided with a fuel pump and having fuel injectors and being subjected to low temperature conditions in which fuel is supplied to the diesel engine from a source of diesel fuel and in which excess diesel fuel in a heated condition flows from the diesel engine and in which air is entrained in the heated excess diesel fuel comprising:

a fuel control housing fixedly attached to the diesel engine, the fuel control housing having a fuel control chamber therein, a fuel filter unit attached to the fuel control housing, the fuel control housing having a first passage, the first passage being in communication with the fuel filter unit for flow of fuel from the first passage to the fuel filter unit, a diesel fuel supply tank, a first conduit, the first conduit joining the diesel fuel supply tank to the first passage of the fuel control housing for flow of diesel fuel from the diesel fuel supply tank to the first passage of the fuel control housing, the fuel control housing having a second passage in communication with the fuel filter unit for flow of fuel from the fuel filter unit to the second passage, a second conduit, the second conduit joining the second passage of the fuel control housing to the diesel fuel pump for flow of fuel from the second passage to the diesel fuel pump, a third conduit, the third conduit joining the diesel fuel pump to the fuel injectors of the diesel engine for flow of fuel from the fuel pump to the fuel injectors, the fuel control housing having a third passage, the third passage being in communication with the fuel control chamber for flow of fuel from the third passage to the fuel control chamber, a fourth conduit, the fourth conduit joining the fuel injectors of the diesel engine to the third passage of the fuel control housing for flow of heated excess fuel and entrained air from the fuel injectors to the third passage, the fuel control housing having a connecting passage joining the fuel control chamber to the first passage, a buoyant member within the fuel control chamber, the buoyant member including valve means operable to close and to open the connecting passage with movement of the buoyant member, a mixture of excess heated fuel and entrained air flowing from the fuel injectors through the fourth conduit to the third passage and from the third passage to the fuel control chamber, a thermally responsive actuator device within the second passage and sensing the temperature of the fuel in the second passage, the thermally responsive actuator device including valve means operable to control flow of heated fuel through the connecting passage in response to temperature of the fuel in the second passage sensed by the thermally responsive actuator device, the fuel control chamber being filled with the mixture of excess heated fuel and entrained air during normal operation of the diesel engine, the buoyant member rising and falling within the fuel control chamber and within the mixture of excess heated fuel and air and operating the valve means to open and to close the connecting passage in accordance with the density of the mixture of heated excess fuel and entrained air in the fuel control chamber, the connecting passage conducting heated fuel therethrough to the first passage for mixing of the heated fuel with fuel which enters the first passage from the diesel fuel supply tank, the mixture of heated fuel and fuel from the fuel supply tank then traveling through the fuel filter unit to the second conduit and through the second conduit to the fuel pump and from the fuel pump to the fuel injectors of the diesel engine.

4. Diesel fuel control apparatus for a diesel system provided with a diesel engine and a diesel fuel supply tank, the diesel engine receiving fuel for operation thereof and discharging heated excess fuel with air entrained therein, comprising:

a fuel control housing having an upper portion and a lower portion and being provided with a fuel control chamber therein between the upper portion and the lower portion, a buoyant member within the fuel control chamber, the fuel control housing having a first passage above the fuel control chamber and in communication with the fuel control chamber, a fuel filter housing attached to the fuel control housing at the lower portion thereof, there being a fuel filter chamber within the fuel filter housing, the fuel control housing having a second passage, the second passage being in communication with the fuel filter chamber of the fuel filter housing, the fuel control housing having a connecting passage in the lower portion thereof leading from the fuel control chamber to the second passage, the fuel control housing having a third passage, the third passage being in communication with the fuel filter chamber of the fuel filter housing, valve means operable to close and to open the connecting passage for control of fluid flow therethrough from the fuel control chamber to the second passage, means connecting the valve means to the buoyant member for operation of the valve means with operation of the buoyant member, the diesel system including first conduit means, second conduit means, third conduit means and fourth conduit means, the first conduit means joining the fuel supply tank to the second passage of the fuel control housing, the second conduit means joining the third passage of the fuel control housing to the diesel engine, the third conduit means joining the diesel engine to the first passage of the fuel control housing, the fourth conduit means joining the first passage of the fuel control housing to the fuel supply tank, the fuel control chamber receiving a mixture of heated excess fuel and entrained air from the diesel engine, the buoyant member operating the valve member in accordance with the density of the mixture of heated excess fuel and entrained air within the fuel control chamber for flow of heated fuel from the fuel control chamber through the connecting passage and through the second passage to mix with fuel entering the second passage from the diesel fuel supply tank, air which separates in the fuel control chamber from the heated excess fuel flowing from the fuel control chamber through the first passage and into the fourth conduit for flow to the fuel supply tank.

5. Diesel fuel control apparatus for a diesel system provided with a diesel engine and a diesel fuel supply tank, the diesel engine receiving fuel for operation thereof and discharging heated excess fuel with air entrained therein, comprising:

a fuel control housing having an upper portion and a lower portion and being provided with a fuel control chamber therein between the upper portion and the lower portion, a buoyant member within the fuel control chamber, the fuel control housing having a first passage above the fuel control chamber and in communication with the fuel control chamber, a fuel filter housing attached to the fuel control housing at the lower portion thereof, there being a fuel filter chamber within the fuel filter housing, the fuel control housing having a second passage, the second passage being in communication with the fuel filter chamber of the fuel filter housing, the fuel control housing having a connecting passage in the lower portion thereof leading from the fuel control chamber to the second passage, the fuel control housing having a third passage, the third passage being in communication with the fuel filter chamber of the fuel filter housing, valve means operable to close and to open the connecting passage for control of fluid flow therethrough from the fuel control chamber to the second passage, means connecting the valve means to the buoyant member for operation of the valve means with operation of the buoyant member, a thermally responsive actuator device within the third passage of the fuel control housing and including a valve member within the connecting passage for controlling flow of fuel through the connecting passage in accordance with the temperature of the fuel flowing through the third passage, the diesel system including first conduit means, second conduit means, third conduit means and fourth conduit means, the first conduit means joining the fuel supply tank to the second passage of the fuel control housing, the second conduit means joining the third passage of the fuel control housing to the diesel engine, the third conduit means joining the diesel engine to the first passage of the fuel control housing, the fourth conduit means joining the first passage of the fuel control housing to the fuel supply tank, the fuel control chamber receiving a mixture of excess heated fuel and entrained air from the diesel engine through the first passage, the buoyant member operating the valve member in accordance with the proportions of excess heated fuel and entrained air in the mixture thereof within the fuel control chamber for flow of fuel from the fuel control chamber through the connecting passage and through the second passage to mix with fuel entering the second passage from the diesel fuel supply tank, air which separates in the fuel control chamber from the excess fuel flowing from the fuel control chamber through the first passage and into the fourth conduit for flow to the fuel supply tank.

6. For use in a diesel system in which a diesel engine is supplied with fuel from a fuel supply tank and in which the diesel engine consumes a portion of the fuel and in which a mixture of excess heated fuel and entrained air flows from the diesel engine, the combination: a diesel fuel control housing adapted to be attached to the diesel engine, the fuel control housing having a fuel inlet passage for receiving fuel from the fuel supply tank, the fuel control housing having a fuel outlet passage for directing fuel from the fuel control housing to the diesel engine, a diesel fuel filter housing removably attached to the diesel fuel control housing and supported by the fuel control housing, the fuel control housing forming a diesel fuel control chamber, the diesel fuel filter housing forming a fuel filter chamber provided with a fuel filter element therein, the fuel control housing forming a passage for directing fuel from the fuel inlet passage of the fuel control housing into the fuel filter chamber of the fuel filter housing, the fuel control housing forming a passage for directing fuel from the fuel filter chamber of the fuel filter housing into the fuel outlet passage of the fuel control housing, the fuel control housing forming a connecting passage between the fuel control chamber and the fuel inlet passage of the fuel control housing, the fuel control housing forming a passage for directing a mixture of excess heated fuel and entrained air into the fuel control chamber from the diesel engine, the fuel control housing forming a passage for directing air from the fuel control chamber to the fuel supply tank, and a buoyant member within the fuel control chamber and sensing the density of the mixture of excess heated fuel and entrained air, a valve member attached to the buoyant member and controlling flow of heated fuel from the fuel control chamber through the connecting passage and to the fuel inlet passage in accordance with operation of the buoyant member.

7. Diesel fuel control apparatus for a diesel system provided with a diesel engine and a diesel fuel supply tank, the diesel engine receiving fuel for operation thereof and discharging heated excess fuel with air entrained therein, comprising:

a fuel control housing provided with a fuel control chamber therein, the fuel control housing being adapted to receive and support a fuel filter housing which has a fuel filter chamber therewithin, a buoyant member within the fuel control chamber, the fuel control housing having a first passage in communication with the fuel control chamber of a fuel filter housing attached to the fuel control housing, the fuel control housing having a second passage, the second passage being in communication with the fuel filter chamber of the fuel filter housing, the fuel control housing having a connecting passage leading from the fuel control chamber to the second passage, the fuel control housing having a third passage, the third passage being in communication with the fuel filter chamber of the fuel filter housing, buoyantly operable valve means within the fuel control chamber and operable to close and to open the connecting passage for control of fluid flow therethrough from the fuel control chamber to the second passage, a thermally responsive valve device within the fuel control housing and sensing the temperature of fuel flowing therewithin, including a valve member controlling flow of fuel between the connecting passage and the second passage in response to the temperature of the fuel sensed by the thermally responsive valve device, the fuel control housing being adapted to be positioned within a diesel system which includes a first conduit, a second conduit, a third conduit, and a fourth conduit, the first conduit joining the fuel supply tank to the second passage of the fuel control housing, the second conduit joining the third passage of the fuel control housing to the diesel engine, the third conduit joining the diesel engine to the first passage of the fuel control housing, the fourth conduit joining the first passage of the fuel control housing to the fuel supply tank, the fuel control chamber receiving from the first passage a mixture of heated excess fuel and entrained air from the diesel engine, the buoyantly operable valve means operating in accordance with the proportions of heated excess fuel and entrained air in the mixture thereof within the fuel control chamber for flow of heated fuel from the fuel control chamber through the connecting passage and through the second passage to mix with fuel entering the second passage from the diesel fuel supply tank, air which separates in the fuel control chamber from the heated excess fuel flowing from the fuel control chamber through the first passage and into the fourth conduit for flow to the fuel supply tank.

8. Diesel fuel control apparatus for a diesel system provided with a diesel engine and a diesel fuel supply tank, the diesel engine receiving fuel for operation thereof and discharging heated excess fuel with air entrained therein, comprising:

a fuel control housing provided with a fuel control chamber therein, the fuel control housing being adapted to receive and support a fuel filter housing which has a fuel filter chamber therewithin, a buoyant member within the fuel control chamber, the fuel control housing having a first passage in communication with the fuel control chamber of a fuel filter housing attached to the fuel control housing, the fuel control housing having a second passage, the second passage being in communication with the fuel filter chamber of the fuel filter housing, the fuel control housing having a connecting passage leading from the fuel control chamber to the second passage, the fuel control housing having a third passage, the third passage being in communication with the fuel filter chamber of the fuel filter housing, buoyantly operable valve means within the fuel control chamber and operable to close and to open the connecting passage for control of fluid flow therethrough from the fuel control chamber to the second passage, the fuel control housing being adapted to be positioned within a diesel system which includes a first conduit, a second conduit, a third conduit and a fourth conduit, the first conduit joining the fuel supply tank to the second passage of the fuel control housing, the second conduit joining the third passage of the fuel control housing to the diesel engine, the third conduit joining the diesel engine to the first passage of the fuel control housing, the fourth conduit joining the first passage of the fuel control housing to the fuel supply tank, the fuel control chamber receiving a mixture of heated excess fuel and entrained air from the diesel engine, the buoyantly operable valve means operating in accordance with the proportions of heated excess fuel and entrained air in the mixture thereof within the fuel control chamber for flow of heated fuel from the fuel control chamber through the connecting passage and through the second passage to mix with fuel entering the second passage from the diesel fuel supply tank, air which separates in the fuel control chamber from the heated excess fuel flowing from the fuel control chamber through the first passage and into the fourth conduit for flow to the fuel supply tank.

9. For use in a diesel system in which a diesel engine is supplied with fuel from a fuel supply tank and in which the diesel engine consumes a portion of the fuel and in which a mixture of excess heated fuel and entrained air flows from the diesel engine, the combination: a diesel fuel control housing adapted to be attached to the diesel engine, the fuel control housing having a fuel inlet passage for receiving fuel from the fuel supply tank, the fuel control housing having a fuel outlet passage for directing fuel from the fuel control housing to the diesel engine, a diesel fuel filter housing removably attached to the diesel fuel control housing and supported by the fuel control housing, the fuel control housing forming a diesel fuel control chamber, the diesel fuel filter housing forming a fuel filter chamber provided with a fuel filter element therein, the fuel control housing forming a passage for directing fuel from the fuel inlet passage of the fuel control housing into the fuel filter chamber of the fuel filter housing, the fuel control housing forming a passage for directing fuel from the fuel filter chamber of the fuel filter housing into the fuel outlet passage of the fuel control housing, the fuel control housing forming a connecting passage between the fuel control chamber and the fuel inlet passage of the fuel control housing, the fuel control housing forming passages for directing a mixture of excess heated fuel and entrained air into the fuel control chamber from the diesel engine and for directing air to the fuel supply tank, a buoyantly operable valve member within the fuel control chamber and controlling flow of heated fuel from the fuel control chamber through the connecting passage and to the fuel inlet passage, a thermally responsive actuator member within the fuel control housing for sensing the temperature of fuel flowing in the fuel outlet passage of the fuel control housing and a valve member joined to the thermally responsive actuator member and controlling flow of fuel from the fuel control chamber through the connecting passage into the fuel inlet passage of the fuel control housing in accordance with the temperature of the fuel sensed by the thermally responsive actuator member.

10. A diesel fuel control system for control of diesel fuel to a diesel engine provided with a fuel pump and having fuel injectors and subjected to low temperature conditions in which fuel is supplied to the diesel engine from a source of diesel fuel and in which excess diesel fuel in a heated condition flows from the diesel engine and in which air is entrained in the heated excess diesel fuel comprising:

a fuel control housing fixedly attached to the diesel engine, the fuel control housing having a fuel control chamber therein, a fuel filter unit attached to the fuel control housing, the fuel control housing having a first passage, the first passage being in communication with the fuel filter unit for flow of fuel from the first passage to the fuel filter unit, a diesel fuel supply tank, a first conduit, the first conduit joining the diesel fuel supply tank to the first passage of the fuel control housing for flow of diesel fuel from the diesel fuel supply tank to the first passage of the fuel control housing, the fuel control housing having a second passage in communication with the fuel filter unit for flow of fuel from the fuel filter unit to the second passage, a second conduit, the second conduit joining the second passage of the fuel control housing to the diesel fuel pump for flow of fuel from the second passage to the diesel fuel pump, a third conduit, the third conduit joining the diesel fuel pump to the fuel injectors of the diesel engine for flow of fuel from the fuel pump to the fuel injectors, the fuel control housing having a third passage, the third passage being in communication with the fuel control chamber for flow of fuel from the third passage to the fuel control chamber, a fourth conduit, the fourth conduit joining the fuel injectors of the diesel engine to the third passage of the fuel control housing for flow of heated excess fuel and entrained air from the fuel injectors to the third passage, the fuel control housing having a connecting passage joining the fuel control chamber to the first passage, a buoyant member within the fuel control chamber, the buoyant member including valve means operable to close and to open the connecting passage with movement of the buoyant member, a mixture of excess heated fuel and entrained air flowing from the fuel injectors through the third conduit to the third passage and from the third passage to the fuel control chamber, the fuel control chamber being filled with the mixture of excess heated fuel and entrained air during normal operation of the diesel engine, the buoyant member rising and falling within the fuel control chamber and within the mixture of excess heated fuel and air and operating the valve means to open and to close the connecting passage in accordance with the density of the mixture of heated excess fuel and entrained air in the fuel control chamber, the connecting passage permitting flow of heated fuel therethrough to the first passage for mixing of the heated fuel with fuel which enters the first passage from the diesel fuel supply tank, the mixture of heated fuel and fuel from the fuel supply tank then traveling through the fuel filter unit to the second conduit and through the second conduit to the fuel pump and from the fuel pump to the fuel injectors of the diesel engine.

* * * * *